(12) United States Patent
Morgan et al.

(10) Patent No.: US 7,643,257 B1
(45) Date of Patent: *Jan. 5, 2010

(54) WIRING DEVICE WITH MULTI-SHOT MISWIRE

(75) Inventors: Kent Morgan, Groton, NY (US); Jeffrey C. Richards, Baldwinsville, NY (US); Thomas N. Packard, Syracuse, NY (US)

(73) Assignee: Pass and Seymour, Inc., Syracuse, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 11/870,815

(22) Filed: Oct. 11, 2007

Related U.S. Application Data (63) Continuation of application No. 11/237,399, filed on Sep. 28, 2005, now Pat. No. 7,298,598.

(51) Int. Cl.
*H02H 3/00* (2006.01)
(52) U.S. Cl. ............................................. 361/42
(58) Field of Classification Search .............. 361/42
See application file for complete search history.

(56) References Cited

U.S. PATENT DOCUMENTS

| | | | |
|---|---|---|---|
| 5,600,524 A | 2/1997 | Neiger | |
| 5,706,155 A | 1/1998 | Neiger et al. | |
| 5,729,417 A | 3/1998 | Neiger | |
| 6,040,967 A | 3/2000 | DiSalvo | |
| 6,522,510 B1 | 2/2003 | Finlay et al. | |
| 6,628,486 B1 | 9/2003 | Macbeth | |
| 6,795,285 B1 | 9/2004 | Jozwiak et al. | |
| 6,937,452 B2 | 8/2005 | Chan | |
| 7,187,526 B2 | 3/2007 | DiSalvo | |
| 7,196,886 B2 | 3/2007 | Chan | |
| 7,292,419 B1 | 11/2007 | Nemir | |
| 7,298,598 B1 * | 11/2007 | Morgan et al. ............ 361/45 |
| 2004/0257725 A1 | 12/2004 | Chan | |
| 2005/0117264 A1 | 6/2005 | Aromin | |
| 2006/0285262 A1 | 12/2006 | Neiger | |
| 2007/0030608 A1 | 2/2007 | Baldwin | |
| 2008/0007879 A1 | 1/2008 | Zaretsky | |

* cited by examiner

*Primary Examiner*—Stephen W Jackson
(74) *Attorney, Agent, or Firm*—Daniel P. Malley; Bond Schoeneck & King, PLLC (57) ABSTRACT

The present invention is directed to a protective wiring device that includes a plurality of line terminals coupled to a plurality of load terminals by way of at least one conductive path. A miswire detection circuit is coupled to the at least one conductive path. The miswire detection circuit is configured to monitor signal propagation characteristics on the at least one conductive path and generate a miswire detection signal based on the signal propagation characteristics commencing each time source power is applied to either the plurality of line terminals or the plurality of load terminals. A fault detection circuit is coupled to the at least one conductive path. The fault detection circuit is configured to detect a fault condition propagating on the at least one conductive path. The fault detection circuit is configured to generate a trip signal in response to either the fault condition or the miswire detection signal. A circuit interrupter is coupled to the fault detection circuit. The circuit interrupter is configured to introduce an electrical discontinuity in the at least one conductive path in response to the trip signal.

25 Claims, 8 Drawing Sheets

WIRING DEVICE WITH MULTI-SHOT MISWIRE

CROSS-REFERENCE TO RELATED APPLICATIONS

This is a continuation of U.S. patent application Ser. No. 11/237,399 filed on Sep. 28, 2005 now U.S. Pat. No. 7,298,598, the contents of which are relied upon and incorporated herein by reference in its entirety, and the benefit of priority under 35 U.S.C. §120 is hereby claimed.

BACKGROUND OF THE INVENTION

1. Field of the Invention

The present invention relates generally to electrical wiring devices, and particularly to protective wiring devices.

2. Technical Background

AC power is provided to a house, building or other such facilities by coupling one or more breaker panels to an electrical distribution system, or another such source of AC power. The breaker panel distributes AC power to one or more branch electric circuits installed in the structure. The electric circuits typically include one or more receptacle outlets and may further transmit AC power to one or more electrically powered devices, commonly referred to in the art as load circuits. The receptacle outlets provide power to user-accessible loads that include a power cord and plug, with the plug being insertable into the receptacle outlet. Because certain types of faults have been known to occur in electrical wiring systems, each electric circuit typically employs one or more electric circuit protection devices. Electric circuit protective devices have been disposed within the breaker panel, receptacle outlets, plugs and the like.

Both receptacle wiring devices and electric circuit protective wiring devices in general, are disposed in an electrically non-conductive housing. The housing includes electrical terminals that are electrically insulated from each other. The line terminals are intended to be connected by the installer to a power source of an electrical distribution system, and the feed-through load terminals are intended to be connected to provide the electrical power to downstream receptacles, lighting fixtures, switches, and the like. Receptacle load terminals are electrically connected to the feed-through load terminals. The receptacle load terminals are configured to align with the blades of an attachment plug in order to provide source power by way of the plug to a user attachable load. Protective devices typically include a circuit interrupter that connects the line terminals to the load terminals in the reset state and disconnects the line terminals from the feed-through and receptacle load terminals in the tripped state. The circuit interrupter trips when a fault condition occurs. There are various types of protective devices including ground fault circuit interrupters (GFCIs), ground-fault equipment protectors (GFEPs), and arc fault circuit interrupters (AFCIs). Some protective devices include both GFCIs and AFCIs.

An arc fault typically manifests itself as a high frequency current signal. Accordingly, an AFCI may be configured to detect various high frequency signals and de-energize the electrical circuit in response thereto. A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. Ground faults, as well as arc faults, may also result in fire.

A "grounded neutral" is another type of ground fault. This type of fault may occur when the load neutral terminal, or a conductor connected to the load neutral terminal, becomes grounded. While this condition does not represent an immediate shock hazard, it may lead to serious hazard. As noted above, a GFCI will trip under normal conditions when the differential current is greater than or equal to approximately 6 mA. However, when the load neutral conductor is grounded the GFCI becomes de-sensitized because some of the return path current is diverted to ground. When this happens, it may take up to 30 mA of differential current before the GFCI trips. Therefore, if a double-fault condition occurs, i.e., if the user comes into contact with a hot conductor (the first fault) when simultaneously contacting a neutral conductor that has been grounded on the load side (the second fault), the user may experience serious injury or death.

Another type of fault condition is commonly referred to as miswiring, or reverse wiring. A protective device may be miswired during installation by connecting the load terminals to AC power. When this happens, the circuit interrupter may be unable to interrupt the flow of electrical current to the receptacle terminals when a fault condition is present. Unfortunately, protective devices do not typically alert the user to the miswire condition. Thus, it is not until damage or injury occur that the miswired condition is evident. As noted above, receptacle load terminals and the feed-through load terminals may be permanently connected by an electrical conductor. When a device is properly wired, the circuit interrupter typically includes a single breaker that breaks the connection between the line terminals and both the feed-through load terminals and the receptacle load terminals. In other words, the typical protective device is not configured to remove power from the user load when a hazardous fault condition is extant. Accordingly, when a receptacle type device is reverse wired, unprotected AC power may be available at the receptacle load terminals when the circuit interrupter is in the tripped state.

Protective devices may be equipped with a test button. However, while test buttons may be determine the ability of the protective device to detect and interrupt a fault condition, they are typically not configured to reveal a reverse-wired condition. Accordingly, many devices are provided with wiring instruction sheets. Unfortunately, instruction sheets are often ignored by installers.

In one approach that has been considered, a protective device is equipped with a barrier(s) that is/are configured to prevent circuit reset until AC voltage is present at the line terminals. The barrier may alert the installer to the reverse-wired condition by preventing reset of the device and by denying AC power to the feed-through load. This approach may be effective during the original installation of the protective device. However, once proper installation is effected the barrier is deactivated and inoperative during a subsequent re-installation. This drawback is further exacerbated by the fact that the installation instructions are unlikely to be available for any re-installation.

In another approach that has been considered, a protective device may be equipped with a fuse that is configured to prevent circuit interrupter reset until AC voltage is provided to the line terminals. The fuse circuit prevents reset of the device and denies power to the feed-through load until proper wiring is effected. Once proper wiring is effected, the fuse blows and is no longer available to detect a reverse-wired condition if there is a reinstallation. Again, making matters worse, the installation instructions are likely to be lost and not available for any re-installation.

In another approach that has been considered, a protective device may be equipped with one or more sets of isolating contacts disposed between the feed-through load terminals and the receptacle load terminals. In this approach, the set of isolating contacts may be controlled by a miswire detection circuit. In the event of a miswire condition, the miswire detection circuit is configured to either open (or prevent closure) of the isolating contacts. After a proper wiring condition is detected, the miswire detection circuit is configured to either close (or permit closure) of the isolating contacts. Like the other approaches considered above, the miswire detection circuit is ineffectual after an initial proper installation, and is no longer available to detect a reverse-wired condition during any reinstallation. Thus, the isolating contacts are closed in spite of a reverse wired condition.

What is needed is a protective device that denies power to the protected circuit, including receptacle terminals, during a miswired condition. Further, a protective device, responsive to the miswired condition during each and every installation, is needed.

SUMMARY OF THE INVENTION

The present invention addresses the needs described above. In particular, the present invention is directed to a protective device that denies power to the protected circuit, including receptacle terminals, during a miswired condition. More importantly, the protective device of the present invention is responsive to the miswired condition during each and every installation.

One aspect of the present invention is a protective wiring device that includes a plurality of line terminals coupled to a plurality of load terminals by way of at least one conductive path. A miswire detection circuit is coupled to the at least one conductive path. The miswire detection circuit is configured to monitor signal propagation characteristics on the at least one conductive path and generate a miswire detection signal based on the signal propagation characteristics commencing each time source power is applied to either the plurality of line terminals or the plurality of load terminals. A fault detection circuit is coupled to the at least one conductive path. The fault detection circuit is configured to detect a fault condition propagating on the at least one conductive path. The fault detection circuit is configured to generate a trip signal in response to either the fault condition or the miswire detection signal. A circuit interrupter is coupled to the fault detection circuit. The circuit interrupter is configured to introduce an electrical discontinuity in the at least one conductive path in response to the trip signal.

In another aspect, the present invention is directed to a method for wiring a protective device in an electrical circuit. The protective device includes a plurality of line terminals coupled to a plurality of load terminals by way of at least one conductive path. The method includes connecting the plurality of load terminals to source voltage. Signal propagation characteristics on the at least one conductive path are monitored, monitoring commencing each time source voltage is applied to the plurality of load terminals. A miswire trip signal is generated based on a predetermined signal propagation characteristic. An electrical discontinuity is introduced in the at least one conductive path in response to the trip signal.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective device of the present invention is shown in FIG. 1, and is designated generally throughout by reference numeral 10.

As described in more detail below, protective device 10 includes a plurality of line terminals coupled to a plurality of load terminals by way of at least one conductive path. When the plurality of load terminals are connected to source voltage, device 10 monitors signal propagation characteristics on the at least one conductive path. Device 10 is configured such that the step of monitoring commences each time source voltage is applied to the plurality of load terminals. A miswire trip signal is generated based on a predetermined signal propagation characteristic. An electrical discontinuity is introduced in the at least one conductive path in response to the trip signal.

Figure 1:
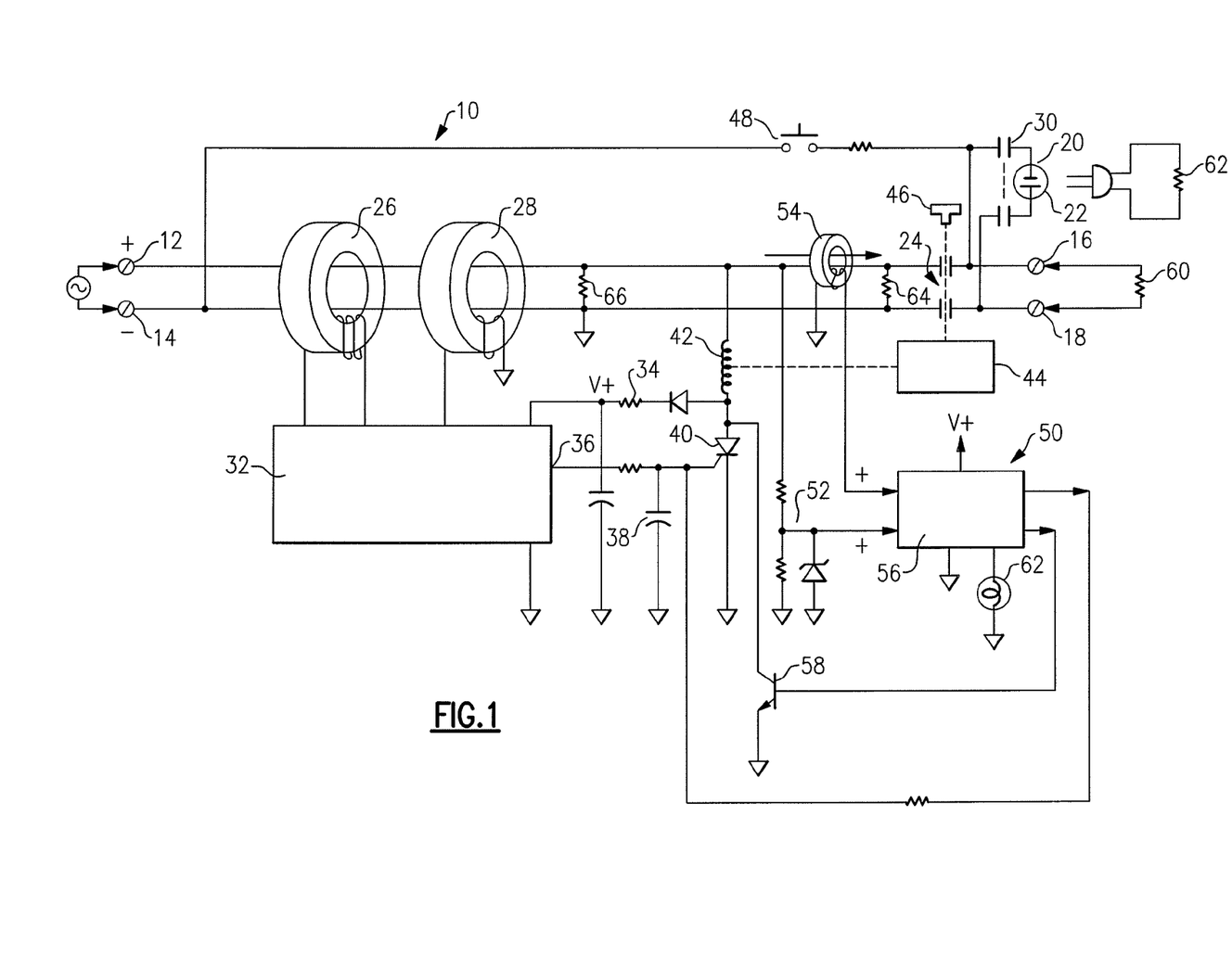
FIG. 1 is a schematic diagram of a protective device in accordance with a first embodiment of the present invention.
Figure 2:
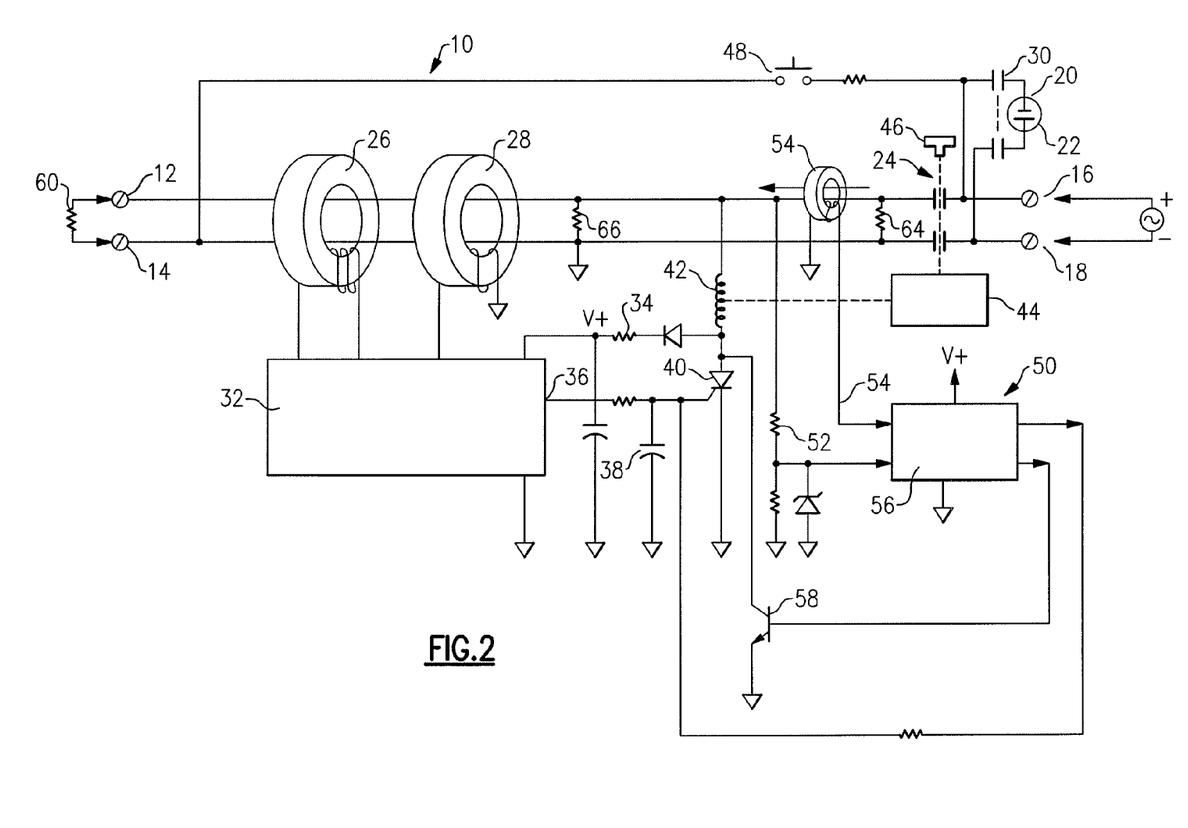
FIG. 2 is a schematic of the protective device shown in FIG. 1 in a miswired state.

Referring to FIG. 1 and FIG. 2, a schematic diagram of a protective device 10 in accordance with a first embodiment of the present invention is disclosed. FIG. 2 is a schematic diagram of the protective device in a miswired state.

Device 10 typically includes a hot line terminal 12 and a neutral line terminal 14. Line terminals 12, 14 are coupled to sensor 26 and sensor 28 by way of a hot conductive path and a neutral conductive path, respectively. The conductive paths are connected to circuit interrupter 24. Circuit interrupter 24 couples the line terminals (12, 14) to the feed-through terminals (16, 18) and the receptacle terminals (20, 22) when circuit interrupter 24 is in a reset state. Those of ordinary skill in the art will understand that load terminals 16, 18, may be connected to wires coupled to one or more downstream receptacles, or switches, in a daisy chain arrangement. Receptacle terminals 20, 22 are configured to mate with an appliance plug connected by a power cord to an electrical appliance or a similar electrical load. Of course, circuit interrupter 24 disconnects the line terminals from both the load terminals 16, 18 and the receptacle load terminals 20, 22 in the tripped state.

In one embodiment of the present invention, isolating contacts 30 are configured to disconnect one or more of the feed-through terminals 16, 18 from a corresponding receptacle terminal 20, 22. Such contacts are open when the device has been miswired. Isolating contacts 30 are coupled operably to circuit interrupter 24 such that they are open when circuit interrupter 24 is in the tripped state. Alternatively, isolating contacts 30 are coupled operably to a supplementary interrupter (not shown) such that they are open when device 10 has been miswired.

Device 10 operates as follows. Sensor 26 is a differential transformer which is configured to sense load-side ground faults. Sensor 28 is a grounded neutral transformer and is configured to generate and couple a fault signal to the differential transformer in the event of a grounded-neutral fault condition. Differential transformer 26 and grounded-neutral transformer 28 are coupled to detector circuit 32. Power supply circuit 34 conditions AC power by providing a DC (V+) voltage supply for GFCI detector circuit 32. Detector 32 provides a fault detect output signal 36 in response to sensor inputs from transformers (26, 28.) Output signal 36 is directed into filter circuit 38. The filtered output signal is provided to the control input of SCR 40. SCR 40 is turned ON to energize solenoid 42 when it is turned ON by the filtered output signal. Solenoid 42 drives trip mechanism 44 to open the interrupting contacts in circuit interrupter 24.

The trip solenoid 42 remains energized until the contacts in circuit interrupter 24 are tripped. The open contacts interrupt the flow of fault current. The sensor output signal generated by transformer 26 is also terminated by the interruption of the fault current. When the transformer signal ceases, the detector output signal changes state turning SCR 40 OFF. Once SCR 40 is OFF, solenoid 42 de-energizes within a time period that is less than about 25 milliseconds. After the fault condition has been eliminated, reset button 46 may be employed to reset circuit interrupter 24.

Device 10 also is equipped with a test facility. In particular, when test button 48 is depressed by a user, a simulated fault condition is generated. The simulated fault condition is used to check the operative condition of GFCI 10. Circuit interrupter 24 will trip if the device is properly operating. Power may be restored to device 10 after a successful test by pressing reset button 46. In an alternative embodiment of the present invention, the test facility can be actuated by depressing the reset button 46. Switch contacts in communication with reset button 46 close the test circuit to initiate the test in the manner previously described.

Device 10 includes a miswire lock-out circuit 50. Miswire lock-out circuit 50 includes a voltage sensor 52 that monitors the polarity of the AC (or DC) source voltage. Current transformer 54 monitors the direction of the current (i.e., current polarity) from the voltage source to load 60. When device 10 is properly wired as shown in FIG. 1, the current transformer also monitors the current through a user attachable load 62. If the polarity of the current and the polarity of the voltage match each other, processor 56 determines that device 10 has been properly wired.

Referring to FIG. 2, if the current and voltage polarities oppose each other, processor 56 determines that device 10 has been reverse wired. In response to a reverse wired condition, processor 56 sends a signal to SCR 40 to turn ON, causing circuit interrupter 24 to trip. If the reset button 46 is operated, circuit interrupter 24 momentarily resets, but trips soon thereafter when the miswired condition is again detected by processor 56. The circuit interrupter will continue to trip until the reverse wiring condition is corrected. It is noted that device tripping is automatic, i.e., the installer does not have to manually operate the test facility or manually perform some other action to initiate lock-out. However, sensing current has been described as a prerequisite for determining proper or reverse wiring. Therefore the device will fail to lock-out, even if a miswired condition is present, until such time as a load (60, 62) is connected to the device to generate the current. It is desirable for device 10 to lock-out in response to a miswired condition without having to wait until an external load is connected.

In an alternate embodiment, device 10 may include an internal load 64 disposed between current transformer 54 and circuit interrupter 24. Internal load 64 operates in a similar manner to external load 60 by generating a current flow having a polarity indicative of proper wiring. Unlike load 60, load 64 does not generate a current flow through transformer 54 when device 10 is reverse wired. Thus, when device 10 includes an internal load, lock-out circuit 50 is configured to permit device 10 to reset when the current polarity and the voltage polarity match each other. On the other hand, lock-out circuit 50 is configured to trip device 10 when the current polarity and the voltage polarity oppose each other or when no load current is being sensed by transformer 54 (i.e., before device is connected to an external miswired load 60).

Alternatively, an internal load 66 may be disposed between current transformer 54 and the line terminals 12,14. Load 66 operates in a similar manner to load 60 by generating a current flow through transformer 54 indicative of reverse wiring. Unlike load 60, load 66 does not generate a current flow through transformer 54 when device 10 is properly wired. In this embodiment, lock-out circuit 50 is configured to trip device 10 when the current polarity through load 66 (with or without load 60) compared to the voltage polarity oppose each other. On the other hand, lock-out circuit 50 is configured to permit device 10 to reset when the current polarity and voltage polarity match each other, or when there is no load current present. In yet another embodiment of the present invention, loads 64 and 66 are both be included. This also avoids the need for an external load in order to determine whether the protective device has been properly wired.

Referring back to FIG. 1, a transistor 58 may be disposed between SCR 40 and processor 56. Processor 56 pulses transistor 580N at a predetermined repetition rate to initiate a current through solenoid 42. However, while each pulse generates a current through solenoid 42, the resulting energy in the solenoid is not enough to actuate trip mechanism 44. Solenoid 42 functions as a pulsed load. Processor 50 is configured to determine whether or not device 10 is properly wired on the basis of the direction (polarity) of the pulsed current through solenoid 42 with respect to the voltage polarity. Processor may make a miswire determination on the basis of one or more pulses.

In another embodiment, solenoid 42 may be connected between current transformer 54 and circuit interrupter 24. Alternatively, solenoid 42 may be connected between feed-through load terminals 16, 18 or receptacle load terminals 20,22. In either case, transistor 58 pulses solenoid 42 in the manner previously described. Solenoid 42 again functions as a pulsed load.

In yet another embodiment, transistor 58 is configured to pulse resistors 64 or 66 into conduction (not shown.) In general, the benefit of pulsing the current through an internal load (64, 66, 42) is that a thermal dissipation rating of a load may be reduced by more than ten-fold. Accordingly, the load may be miniaturized.

In the embodiment shown in FIG. 1, an indicator 62 is coupled to processor 56. Indicator 62 includes visible and/or audible indication of a miswired condition. Processor 56 may provide a repetitive signal to indicator 62, in which case indicator 62 provides a blinking and/or beeping indication of a miswired condition.

While FIG. 1 and FIG. 2 are directed to ground fault detection circuitry, the present invention is equally applicable to other types of protective devices. Those of ordinary skill in the art will recognize that substantially all of the various types of protective devices include similar components for sensing, detecting and interrupting the circuit interrupting contacts in response to a particular fault condition. For example, the sensor in an arc fault circuit interrupter (AFCI) is similar to transformer 26 but is typically configured to sense load current instead of differential current and/or line voltage. An AFCI sensor may include at least one of a toroidal transformer, shunt or voltage divider. Further, the detector in the AFCI may be implemented as an integrated circuit similar in form factor to the detector 32. The AFCI detector may also be configured to detect an arc fault condition on the basis of the frequency spectrum of the load current. Those of ordinary skill in the art will recognize that an arc fault may exhibit high frequency noise burst patterns. Once an arc fault condition has been detected, a signal is sent to SCR 40 to trip the device.

Figure 3:
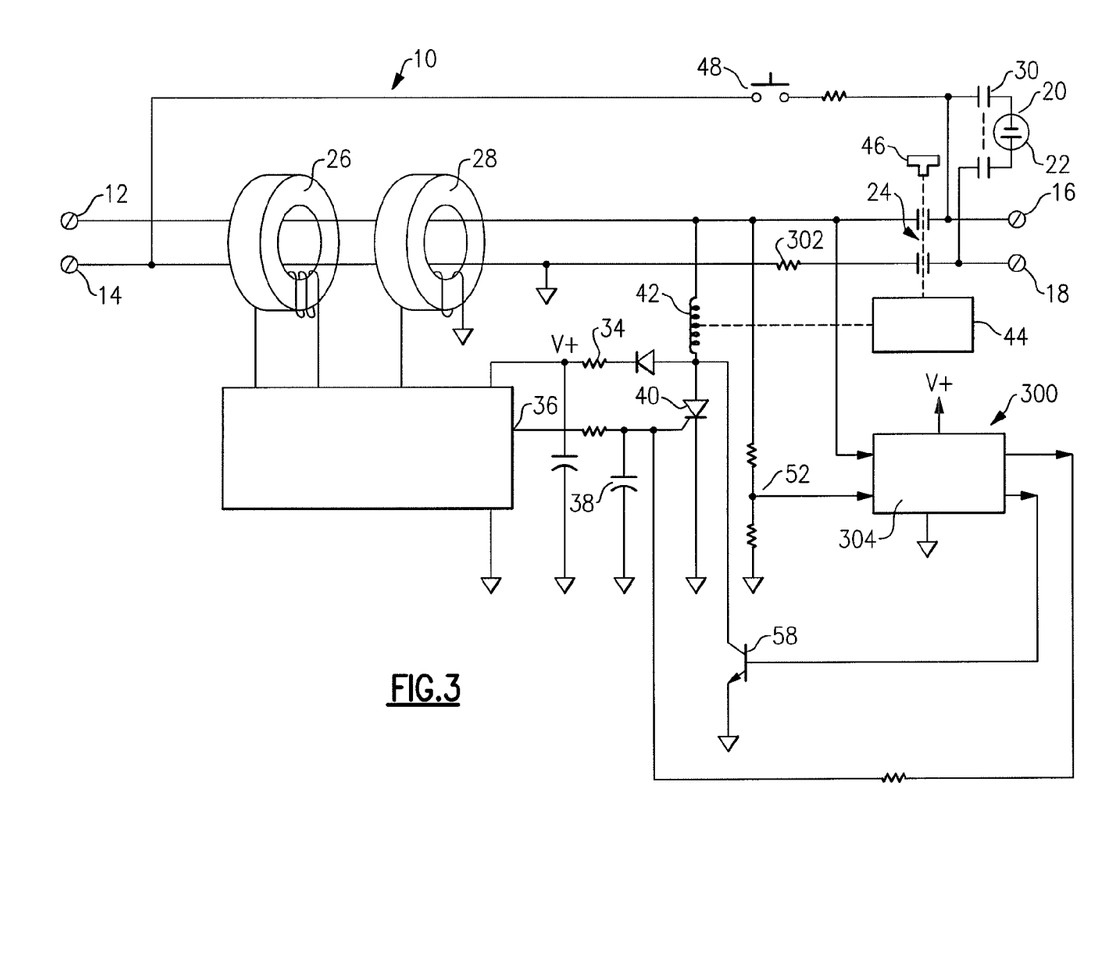
FIG. 3 is a schematic diagram in accordance with a second embodiment of the present invention.

Referring to FIG. 3, a schematic diagram in accordance with a second embodiment of the present invention is disclosed. Miswire lock-out circuit 300 is similar to lock-out circuit 50 shown in FIGS. 1 and 2. The embodiment shown in FIG. 3 includes a shunt sensor 302 coupled to processor 304. The function of sensor 302 is similar to transformer 54. Processor 304 is configured to determine the polarity of the load current using shunt sensor 302.

Figure 4:
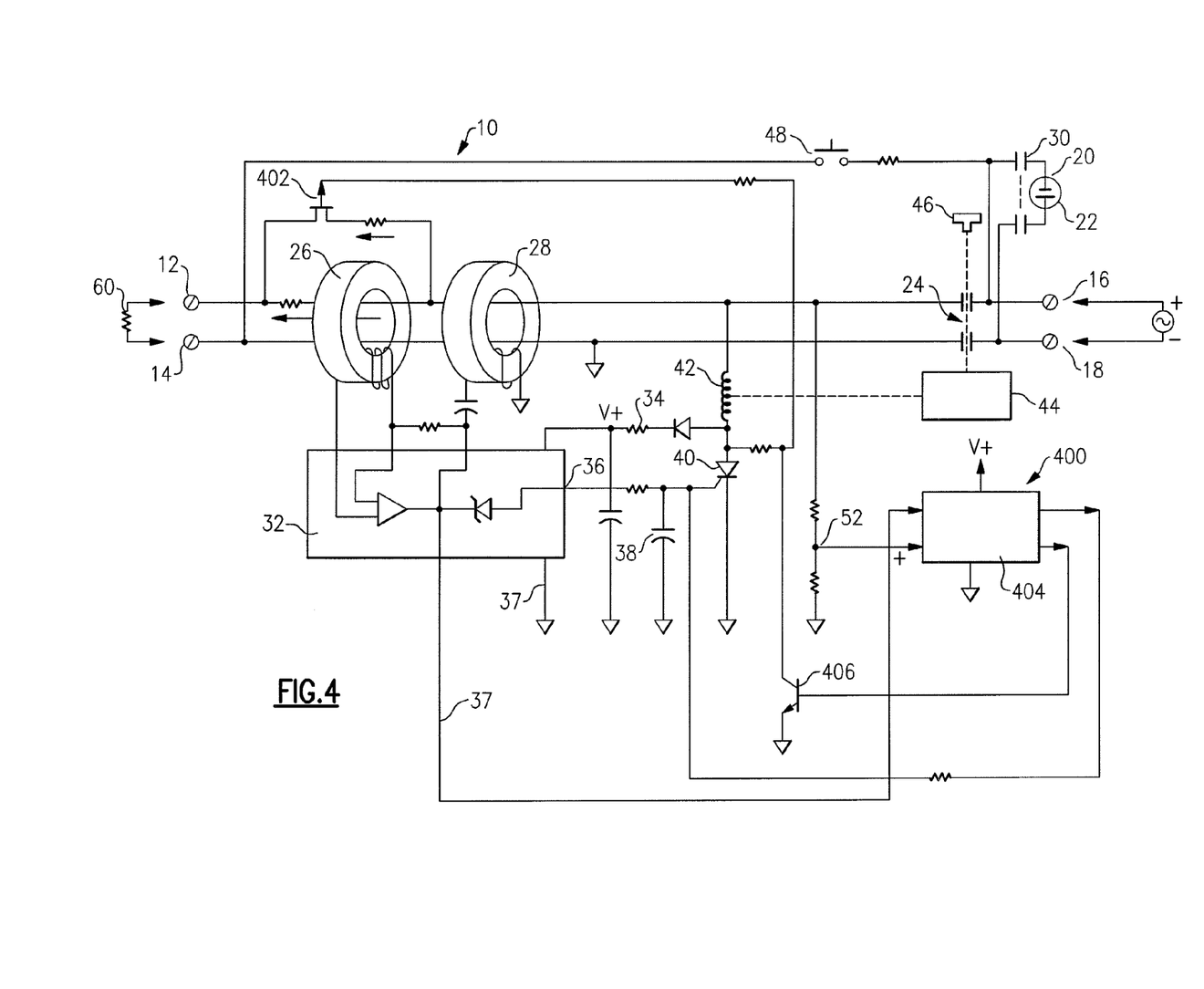
FIG. 4 is a schematic diagram in accordance with a third embodiment of the present invention.

As embodied herein and depicted in FIG. 4, a schematic diagram in accordance with a third embodiment of the present invention is disclosed. This embodiment does not include a separate load current polarity sensor per se. Instead, the protective device itself is configured to determine the polarity of the load current. In particular, miswire lock-out circuit 400 includes a switching device 402 coupled to processor 400 by way of transistor 406. Switching device 402 is open or closed in response to a signal from processor 404. In particular, switching device 402 is opened or closed in response to a signal from processor 404 by way of transistor 406. When switching device 402 is open, currents through line hot conductor 12 and line neutral conductor 14 flow equally and oppositely through differential transformer 26. Accordingly, the differential signal generated by transformer 26 is not indicative of a fault (or simulated fault) condition. However, when switching device 402 is closed, a portion of the load current flowing through one or the other conductor is diverted through the switching device. Since the currents in the two conductors are no longer equal, a fault signal is provided to detector 32. Detector 32 provides an output load current signal to processor 404 on detector output line 37. Processor 404 uses the output load current signal to determine the load current polarity.

It is also noted that transistor 406 may perform a function similar to that performed by transistor 58 in the embodiment depicted in FIG. 1. Transistor 58 provided a pulsed signal to solenoid 42. In response, solenoid 42 was momentarily driven into conduction to provide a pulsed load current. Thus, the embodiment in FIG. 4 provides several means for detecting miswire, or reverse wiring, conditions.

Device 10 is shown in FIG. 4 as being reverse wired. When the AC (or DC) source voltage is positive during the time that switching device 402 is closed, the direction of the summed current through differential transformer 26 results in detector 32 providing a negative current polarity signal to processor 404. Since the voltage and current polarities oppose each other, processor 404 provides a signal to SCR 40 to trip circuit interrupter 24. Switching device 402 may be closed by processor 400 only during the negative half cycle intervals of the AC source voltage cycle. This avoids the possibility of detector output signal 36 causing false tripping since SCR 40 cannot turn ON during negative half cycles.

FIGS. 5A-5E are timing diagrams illustrating the miswire protection functionality of the present invention. The waveforms are described using the references in FIG. 1 but are applicable to other embodiments of the invention as well. The waveforms pertain to a protective device 10 that is reverse-wired and in the reset state, i.e., AC source voltage is connected to the device feed-through terminals 16, 18.

Figure 5A:
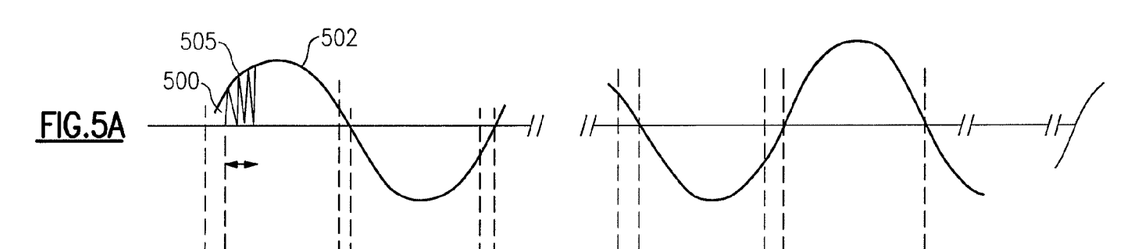
FIGS. 5A-5E are timing diagrams illustrating the miswire protection functionality of the present invention.
Figure 5B:
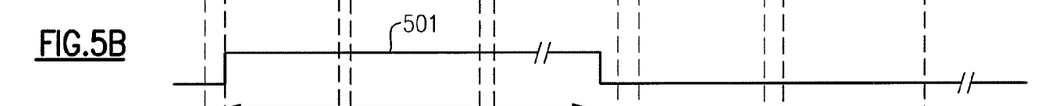

FIG. 5A is a diagrammatic representation of the load current 502. AC source voltage is applied to device 10 at time 500. Referring to FIG. 5B, processor 56 generates a predetermined time delay interval 501 also commencing at time 500. The miswire lock-out circuit is prevented from tripping even if there is a miswire condition, until delay interval 501 elapses. Time interval 501 is pre-programmed into processor 56 based on known transient noise properties. Transient noise 505 may be generated by the initial application of AC power to a device, or by the application of AC power after a power outage. Accordingly, time interval 501 is programmed into processor 56 to prevent transients 501 from initiating a false lockout of device 10. Those of ordinary skill in the art will understand that interval 501 is less than about 1 second.

Figure 5C:
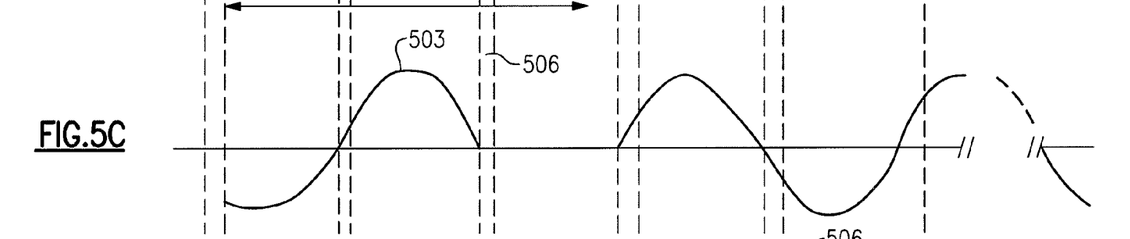

FIG. 5C is a diagrammatic representation of the source voltage 503. Note that AC source voltage 503 is out of phase with load current 502, shown in FIG. 5A. As noted previously, the out of phase condition represents the fact that the protective device has been reverse wired. Note also that AC source voltage 503 and load current 502 are out of phase by a phase shift amount 506. Phase shift 506 represents the possibility of an inductive load shift that loads 64, 66, or 42, if provided, are unable to compensate for.

Figures 5D, 5E:
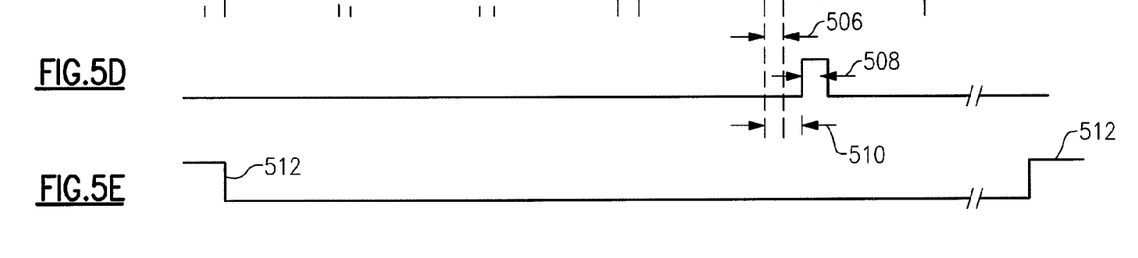

As shown in FIG. 5D, processor 56 pulses a load into conduction during an interval 508. As described above, the pulsing is performed to compare the polarities of the load current and source voltage. In the example provided by FIG. 5, the two signals are of opposite polarity. Thus, processor 56 determines that device 10 has been miswired. Processor 56 may be programmed such that interval(s) 508 occur only during the negative half cycles of the source voltage for the reasons provided above.

Note also that interval(s) 508 must not be allowed to coincide with intervals 506. Despite the fact that device 10 is miswired, the load current and source voltage polarities match in these intervals because of the phase shift 506. Processor 56 is programmed to delay the commencement of interval 508 by a time period 510 from the current zero crossing to avoid an erroneous wiring state indication by processor 56.

Window interval 512 shown in FIG. 5E prevents the miswire detection circuit from causing false tripping. Window 512 is initiated at time 500 and elapses after a predetermined period of time has transpired. Thus, the proper wiring/miswiring decision-making process only occurs within window 512. Once the miswire lock-out circuit 50 completes its task, it is prevented from causing false tripping after interval 512 has elapsed.

Figure 6:
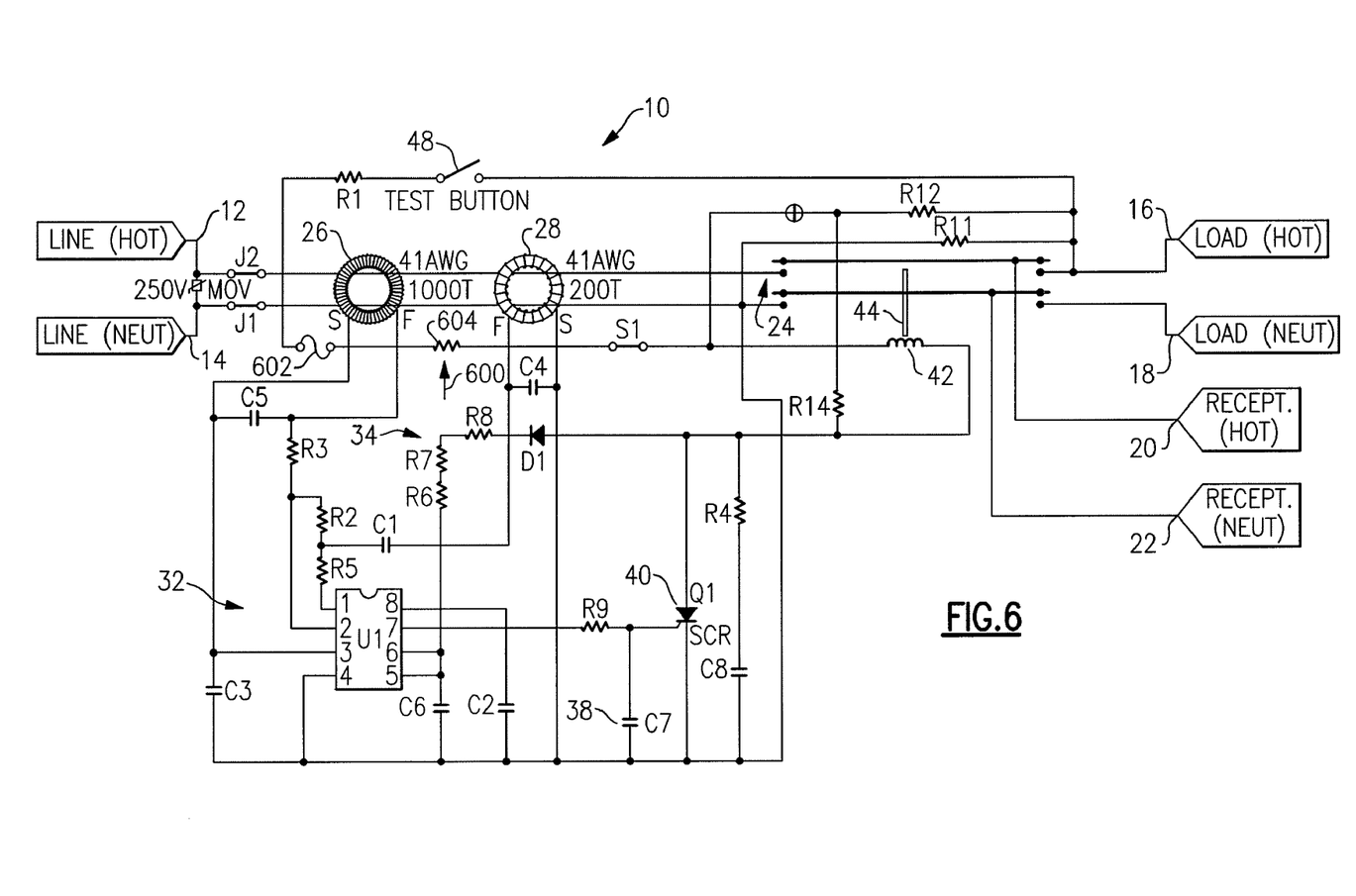
FIG. 6 is a schematic of a miswire lockout circuit in accordance with a fourth embodiment of the present invention.

As embodied herein and depicted in FIG. 6, a schematic of a miswire lockout circuit in accordance with a fourth embodiment of the present invention is disclosed. Reference is made to U.S. patent application Ser. No. 10/884,304, which is incorporated herein by reference as though fully set forth in its entirety, for a more detailed explanation of a miswire circuit including a fuse. Miswire lock-out circuit 600 is connected to the line side of circuit interrupter 24. When protective device 10 is installed, fuse 602 is closed. If the device is properly wired during the installation and the source voltage is turned on, current through the circuit 600 generates a simulated fault current to trip the circuit interrupter 24. Current continues to flow through circuit 600 until a thermal element 604 disposed in circuit 600 opens fuse 602, thus breaking electrical connectivity in the circuit. Once electrical connectivity is broken, the simulated fault current ceases, permitting device 10 to be reset.

Assuming the device is reset, if the device is miswired during the installation and the source voltage is turned on current flows through circuit 600 by way of circuit interrupter 24. The simulated fault current causes the circuit interrupter 24 to trip. In turn, the fault current stops flowing by the tripping action. Note that the circuit interrupter trips in response to the simulated fault current typically in less than 25 milliseconds. The heat generated in thermal element 604 during this time frame is insufficient to open fuse 602. Accordingly, fuse 602 is operational until the device is wired properly. Device 10 will continue to trip after each reset until the device is wired properly.

In an alternate embodiment, fuse 602 is configured to self-heat in response to the current flow, eliminating the need for thermal element 604. Other miswire circuits are similar in performance to circuit 600 but are re-configured to produce a signal or simulated fault signal as appropriate for ground fault circuit interrupters, arc fault circuit interrupters, combination arc fault and ground fault circuit interrupters or other types of protective devices (not shown.)

Fuse 602 may also be implemented using a resettable, or reclosable, fuse. After device 10 is removed from an installation, fuse 602 is closed to thereby restore miswire circuit 600. At this point, the protective device is configured to enter a lock-out state in the event of being miswired during re-installation.

Figure 7:
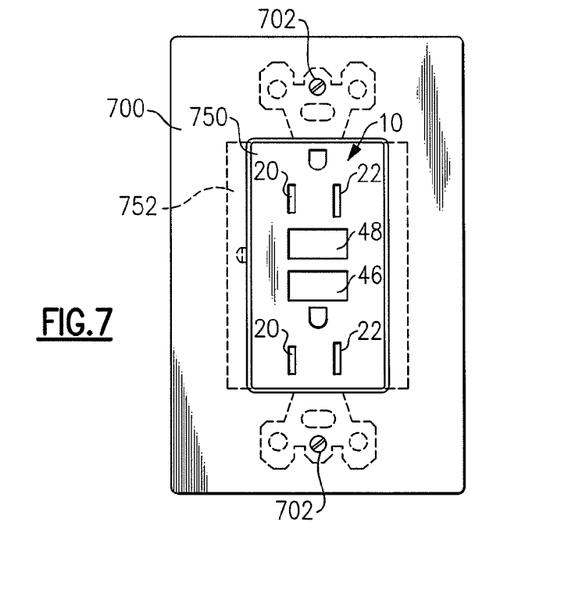
FIG. 7 is a front cover view of a protective device in accordance with the present invention.

FIGS. 7-11 illustrate a typical installation of the present invention. Referring to FIG. 7, a front cover view of a protective device in accordance with the present invention is disclosed. Device 10 includes a front housing 750 that includes a flange 752. The protective device is configured to be covered by a wall plate 700 that is secured to device 10 by way of fasteners 702. Alternatively, device 10 can be covered by a panel that is fastened to device 10 by way of fasteners 702. Fasteners 702 cause wall plate 700 (or the panel) to be pressed against flange 752.

Figure 8:
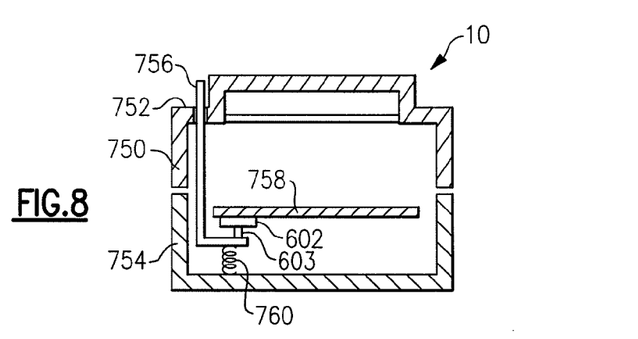
FIGS. 8-9 are cross-sectional views of the protective device in accordance with an embodiment of the present invention.

FIG. 8 is a cross-sectional view of the protective device shown in FIG. 7. Device 10 includes a housing 754 that is configured to mate with the front housing 750. A printed circuit board (PCB) 758 is disposed within device 10. Resettable fuse 602 is coupled to PCB 758. Resettable fuse 602 is reset by applying a momentary force to arm 603. Note that wall plate 700, or the panel, is not shown as being installed in FIG. 8. Thus, probe 756 to free to extend into the unoccupied region above flange 752 due to a biasing force of spring 760. The biasing force of spring 760 also forces arm 603 against fuse 602, urging the fuse to re-close. Accordingly, once the wall plate is removed, the fuse miswire circuit 600 is re-established.

Figure 9:
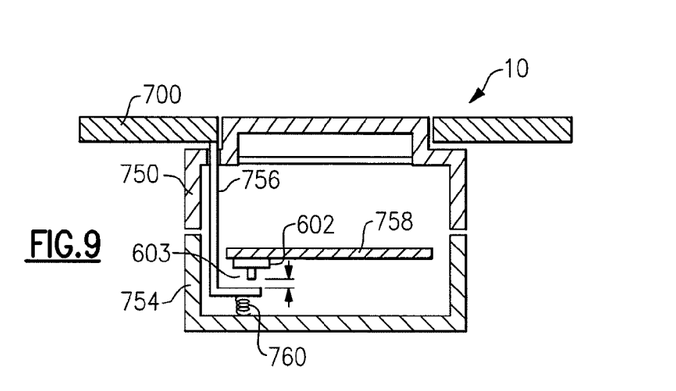

FIG. 9 shows device 10 after re-installation. Wall plate 700 (or the panel) is pressed against flange 752 by way of fasteners 702 directing probe 756 in a downward direction. Probe 756 compresses spring 760 so that force is no longer being applied by arm 603. As such, fuse 602 stays in the closed position until such time as device 10 has been properly wired. As a side benefit, if device 10 is installed, but the wall plate 700 has not been installed, fuse 602 is permanently closed. Thus circuit 600 prevents device 10 from resetting whether device 10 is properly wired or miswired. The rationale behind this safety feature is that without the wall plate, the load terminals are physically accessible to the user. Accordingly, the safety feature prevents the user from being exposed to any voltage present on the load terminals.

It will be apparent to those of ordinary skill in the pertinent art that modifications and variations can be made to resettable fuse 602 of the present invention depending on the form factor of PCB 758 and the disposition of arm 603. By way of example, resettable fuse 602 may be implemented using Model X 2296 manufactured by Thermo-Disc. Of course, those of ordinary skill in the art will recognize that any suitable resettable fuse device may be employed in the present invention.

Figure 10:
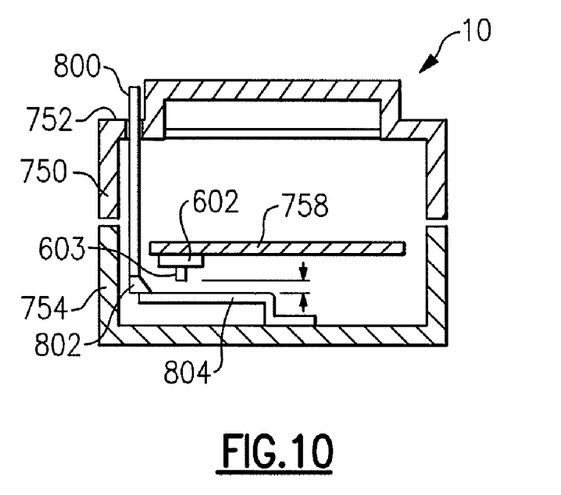
FIGS. 10-11 are cross-sectional views of the protective device in accordance with an alternate embodiment of the present invention.
Figure 11:
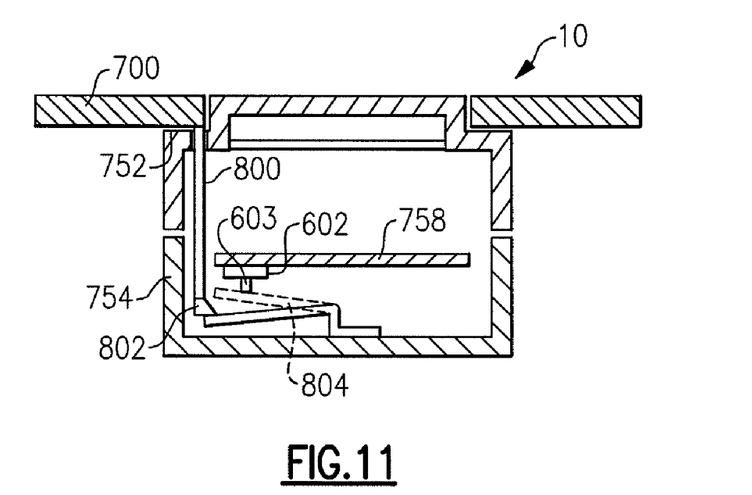

FIGS. 10-11 are cross-sectional views of the protective device in accordance with an alternate embodiment of the present invention. Probe 800 is similar to probe 756 except that it includes striker 802. Striker 802 is configured to deflect cantilever beam 804 when wall plate 700 is installed. Once cantilever 804 is deflected by a predetermined amount, it clears striker 802 and rebounds to momentarily apply a force to arm 603 to re-close the fuse. Accordingly, miswire circuit 600 may be reactivated only by installation of the wall plate. In an alternate embodiment, a striker is configured so that the momentary force to arm 603 occurs when wall plate 700 is removed. For this embodiment, reactivation of the miswire circuit 600 does not require the installation of a wall plate, only the removal of a wall plate.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electrical wiring device comprising:
a plurality of line terminals and a plurality of load terminals, the plurality of line terminals being coupled to the plurality of load terminals in a reset state and decoupled therefrom in a tripped state;
a wiring state detection circuit coupled to the plurality of line terminals or the plurality of load terminals, the wiring state detection circuit being configured to perform a wiring state test cycle to determine a wiring state based on sampling a plurality of AC signal characteristics, the wiring state detection circuit being configured to perform the wiring state test cycle each time the wiring state detection circuit transitions from a deenergized state to an energized state and discontinue performing the wiring state test cycle when the wiring state is determined to be properly wired, the wiring state detection circuit generating a miswire detection signal if the wiring state is determined to be miswired;

a fault detection circuit coupled to the plurality of line terminals, the fault detection circuit being configured to generate a fault detection signal in response to detecting at least one fault condition;

an electronic switch actuator configured to generate a trip signal in response to the miswire detection signal or the fault detection signal; and a circuit interrupter coupled to the electronic switch actuator, the circuit interrupter being configured to drive the plurality of line terminals and the plurality of load terminals into the tripped state in response to the trip signal.

2. The device of claim 1, wherein the circuit interrupter includes four sets of interrupting contacts.

3. The device of claim 1, wherein the plurality of AC signal characteristics include a line voltage polarity and a load current polarity, and wherein the wiring state detection circuit includes a comparator circuit configured to compare the line voltage polarity and the load current polarity, the wiring state being determined to be properly wired if the line voltage polarity and the load current polarity are substantially in-phase, the wiring state being determined to be miswired if the line voltage polarity and the load current polarity are substantially out-of-phase.

4. The device of claim 1, wherein the wiring state detection circuit further comprises:

a current sensor coupled to the plurality of line terminals or the plurality of load terminals, the current sensor being configured to sense a load current polarity;

a voltage sensor coupled to the plurality of line terminals or the plurality of load terminals, the voltage sensor being configured to sense a line voltage polarity; and a processor coupled to the current sensor and the voltage sensor, the processor being configured to generate the wiring state detection signal based on a comparison of the line voltage polarity and the load current polarity.

5. An electrical wiring device comprising:

a plurality of line terminals and a plurality of load terminals, the plurality of line terminals being coupled to the plurality of load terminals in a reset state and decoupled therefrom in a tripped state;

an automated test circuit coupled to the plurality of line terminals or the plurality of load terminals, the automated test circuit being configured to perform an automated test cycle during a predetermined portion of an AC cycle each time the automated test circuit transitions from a deenergized state to an energized state, the automated test circuit being configured to discontinue performing the automated test cycle when the wiring state is determined to be properly wired, the automated test cycle includes transmitting at least one interrogating pulse to at least one load and determining a wiring state based on monitoring response signal characteristics, the automated test circuit generating a miswire detection signal if the wiring state is determined to be miswired;

a fault detection circuit coupled to the plurality of line terminals, the fault detection circuit being configured to generate a fault detection signal in response to detecting at least one fault condition;

an electronic switch actuator configured to generate a trip signal in response to the miswire detection signal or the fault detection signal; and a circuit interrupter coupled to the electronic switch actuator, the circuit interrupter being configured to drive the plurality of line terminals and the plurality of load terminals into the tripped state in response to the trip signal.

6. The device of claim 5, wherein the automated test circuit further comprises:

a current sensor coupled to the plurality of line terminals or the plurality of load terminals, the current sensor being configured to sense a load current polarity;

a voltage sensor coupled to the plurality of line terminals or the plurality of load terminals, the voltage sensor being configured to sense a line voltage polarity;

a processor coupled to the current sensor and the voltage sensor, the processor being configured to generate the miswire detection signal based on a comparison of the line voltage polarity and the load current polarity; and the at least one load includes an internal load coupled to the plurality of line terminals or the plurality of load terminals.

7. The device of claim 6, wherein the internal load is coupled to the plurality of line terminals, the processor being configured to determine that the wiring state represents a miswired condition when the line voltage polarity and the load current polarity are opposite each other.

8. The device of claim 6, wherein the internal load is disposed between the current sensor and the circuit interrupter, the processor being configured to determine that the wiring state represents a miswired condition when current flowing through the internal load is not being sensed by the current sensor.

9. The device of claim 6, wherein the internal load is disposed between the current sensor and the plurality of line terminals, the processor being configured to determine that the wiring state represents a proper wiring condition when current flowing through the internal load is not being sensed by the current sensor.

10. The device of claim 9, wherein the processor is configured to determine that the wiring state represents a miswired condition when the polarity of the current flowing through the internal load and the polarity of the line voltage oppose each other.

11. The device of claim 5, wherein the at least one load is an external load or an internal load, the internal load being a resistive load or an inductive load.

12. The device of claim 5, wherein the automated test circuit is configured to determine that the wiring state is miswired when a load current polarity and a line voltage polarity are substantially opposite to each other when the device is connected to an external load, and wherein the automated test circuit is configured to determine that the wiring state represents a proper wiring condition when a load current polarity and a line voltage polarity are substantially in-phase when the device is connected to an external load.

13. The device of claim 5, wherein the circuit interrupter includes four sets of interrupting contacts.

14. An electrical wiring protection device for installation in an electrical wiring distribution system, the device comprising:

a housing including a plurality of line terminals and a plurality of load terminals at least partially disposed therein;

a wiring state detection circuit coupled to the plurality of line terminals or the plurality of load terminals, the wiring state detection circuit including a resettable switch element coupled to a switch reset actuator, the wiring state detection circuit being enabled only if the resettable switch element is in a closed state, the switch reset actuator being configured to re-close the resettable switch in response to a predetermined stimulus, the wiring state detection circuit being configured to generate a wiring state detection signal if the source of AC power is connected to the plurality of load terminals and not open the resettable switch, the wiring state detection circuit being configured to generate the wiring state detection signal and open the resettable switch if the source of AC power is connected to the plurality of line terminals;

a fault detection circuit coupled to the plurality of line terminals, the fault detection circuit being configured to generate a fault detection signal in response to detecting a fault condition propagating on the plurality of line terminals; and an interrupting contact assembly responsive to the fault detection circuit and the wiring state detection circuit, the interrupting contact assembly including interrupting contacts that provide electrical continuity between corresponding ones of the plurality of line terminals and a plurality of load terminals in a reset state and break electrical continuity between corresponding ones of the plurality of line terminals and a plurality of load terminals in a tripped state.

15. The device of claim 14, wherein the wiring state detection circuit is configured to maintain the resettable switch in a closed state if a source of AC power is coupled to the plurality of load terminals.

16. The device of claim 14, wherein the wiring state detection circuit includes a sensing mechanism coupled to the switch actuator, the sensing mechanism being configured to apply the predetermined stimulus in response to sensing a removal of a face cover plate from the housing.

17. The device of claim 14, wherein the wiring state detection circuit includes a sensing mechanism coupled to the switch actuator, the sensing mechanism being configured to apply the predetermined stimulus in response to the device being de-installed from the electrical wiring distribution system.

18. The device of claim 14, wherein the wiring state detection circuit includes a probe coupled to the switch actuator, the probe being configured to apply the predetermined stimulus in response to a user input.

19. The device of claim 14, wherein the circuit interrupter includes four sets of interrupting contacts.

20. An electrical wiring device comprising:

at least one line terminal coupled to a first conductive path, at least one load terminal coupled to a second conductive path, and at least one user accessible load terminal coupled to a third conductive path, the first conductive path, the second conductive path and the third conductive path being coupled in a reset state, the first conductive path being decoupled from the second conductive path and the third conductive path in a tripped state;

a wiring state detection circuit coupled to the at least one line terminal or the at least one load terminal, the wiring state detection circuit being configured to determine a wiring state each time each time the wiring state detection circuit transitions from a deenergized state to an energized state, the wiring state detection circuit being disabled if the wiring state is determined to be properly wired;

a fault detection circuit coupled to the plurality of line terminals, the fault detection circuit being configured to detect at least one fault condition;

an electronic switch actuator responsive to the fault detection circuit and the wiring state detection circuit in accordance with a determined wiring state, the electronic switch actuator being configured to generate a trip signal; and a circuit interrupter coupled to the electronic switch actuator, the circuit interrupter being driven from the reset state to the tripped state in response to the trip signal.

21. The device of claim 20, wherein the wiring state detection circuit is configured to generate a wiring state detection signal when the line terminals are connected to source power, the wiring state detection signal permitting the circuit interrupter to enter the reset state.

22. The device of claim 20, wherein the electronic switch actuator generates the trip signal in response to the wiring state detection signal.

23. The device of claim 20, further comprising a reset button, the wiring state detection signal being initiated when the reset button is depressed if not disabled.

24. The device of claim 20, wherein the wiring state detection circuit is configured to generate a wiring state detection signal when the load terminals are connected to source power, the electronic switch actuator being configured to generate a trip signal in response thereto.

25. The device of claim 20, wherein the wiring state detection circuit is configured to detect at least two polarities, wherein the reset state is prevented when at least one predetermined combination of polarities is detected by the wiring state detection circuit.

* * * * *

UNITED STATES PATENT AND TRADEMARK OFFICE
CERTIFICATE OF CORRECTION

PATENT NO. : 7,643,257 B1 Page 1 of 1
APPLICATION NO. : 11/870815
DATED : January 5, 2010
INVENTOR(S) : Morgan et al.

It is certified that error appears in the above-identified patent and that said Letters Patent is hereby corrected as shown below:

Column 14, claim 20, line 9, reads "each time each time"

Please delete the duplicate words "each time" such that -- each time -- appears only once in column 14, claim 20, line 9.

Signed and Sealed this

Twenty-third Day of March, 2010

David J. Kappos
*Director of the United States Patent and Trademark Office*